United States Patent [19]

[11] 3,921,205

Fujiwara et al.

[45] Nov. 18, 1975

[54] D.C. CONTROLLED CHROMA CIRCUIT

[75] Inventors: Yoshihiro Fujiwara; Ryuhei Nakabe, both of Hirakata, Japan

[73] Assignee: Matsushita Electric Industrial Co., Ltd., Osaka, Japan

[22] Filed: May 6, 1974

[21] Appl. No.: 467,231

Related U.S. Application Data

[63] Continuation of Ser. No. 284,557, Aug. 29, 1972, abandoned.

[30] Foreign Application Priority Data

Aug. 31, 1971 Japan .............................. 46-67238
Aug. 31, 1971 Japan .............................. 46-67244

[52] U.S. Cl. .................................. 358/34; 358/34
[51] Int. Cl.² ........................................ H04N 9/00
[58] Field of Search ................................... 358/34

[56] References Cited

UNITED STATES PATENTS

| | | | |
|---|---|---|---|
| 3,236,946 | 2/1966 | Hansen et al. | 178/7.3 R |
| 3,515,804 | 6/1970 | Foote | 178/7.3 DC |
| 3,624,275 | 11/1971 | Lunn | 358/40 |
| 3,624,290 | 11/1971 | Hofmann | 178/7.3 DC |
| 3,660,598 | 5/1972 | Theodoulou | 358/34 |
| 3,760,099 | 9/1973 | Kong | 358/34 |
| 3,793,480 | 2/1974 | Waehner | 178/7.3 R |

*Primary Examiner*—Robert L. Griffin
*Assistant Examiner*—George G. Stellar
*Attorney, Agent, or Firm*—Stevens, Davis, Miller & Mosher

[57] ABSTRACT

A chroma controlling circuit in a color television receiver comprising a circuit for demodulating a chroma signal from a chrominance signal and subcarrier, a circuit for extracting the demodulated signal during a blanking period, a circuit for feeding the extracted signal back to the demodulating circuit. The demodulated chroma signal requires no D.C. restorer such as a clamping circuit due to its stabilized D.C. level, thus resulting in a simplified circuit with an integrated circuit realization facilitated.

6 Claims, 6 Drawing Figures

D.C. CONTROLLED CHROMA CIRCUIT

This is a continuation of application Ser. No. 284,557, filed Aug. 29, 1972, now abandoned.

The present invention relates to a chroma controlling circuit, and more particularly to a chroma controlling circuit in which an output terminal of a chroma demodulating circuit is directly coupled to a power amplifying circuit for driving a color picture tube.

Conventional chroma controlling circuits for color television receivers have required a DC restorer circuit such as a clamping circuit because a chroma demodulating circuit of the chroma controlling circuit has been coupled to an amplifying circuit for driving a cathode ray tube through a capacitor coupling. The connection of the clamping circuit to the amplifier makes the whole circuit complicated; for example, the clamping circuit must be series connected to a color signal amplifying circuit thereby required two terminals each serving to connect the clamping capacitor to the color-signal amplifying circuit, when the latter may be obtained in an integrated circuit realization. It is, however, not preferable to provide the integrated circuit with terminals of as many as two for the clamping circuit because the number of the terminals in the integrated circuit must be restricted to as few as possible.

An object of the present invention is to remove the above-mentioned drawbacks and to provide an improved chroma controlling circuit in which a color signal having a D.C. component restored can be obtained by means of simple circuits.

Another object of the present invention is to provide a chroma controlling circuit having a plurality of circuits each of which can be obtained in an integrated circuit realization with ease.

Still another object of the present invention is to provide a chroma controlling circuit having excellent characteristics with little deviation.

The above-mentioned objects and features will be more fully described in connection with the accompanying drawings illustrating embodiments of a chroma controlling circuit according to the present invention, in which FIG. 1 is a block diagram showing an embodiment of a chroma controlling circuit according to the present invention;

Figure 1:
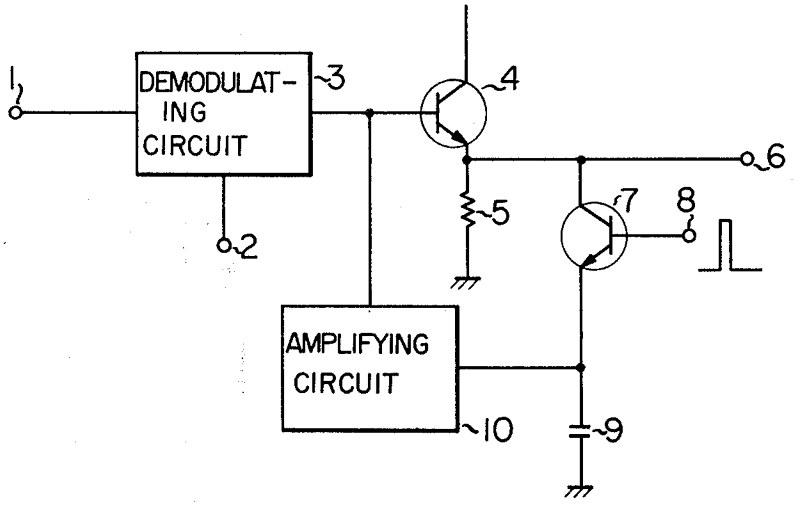

In FIG. 1 there is shown a chroma controlling circuit including an input terminal 1 to which a chrominance signal produced from a band-pass amplifying circuit (not shown) is applied, a terminal 2 to which a subcarrier having a frequency of 3.58 MHz is applied, a circuit 3 for demodulating a chroma signal from these signals, an emitter-follower 4 constituted of a transistor having its base electrode connected to the demodulating circuit 3 and its emitter connected to a resistor 5 serving as load for the transistor, an output terminal 6, a switching transistor 7 having its collector connected to the terminal 6, a terminal 8 which is connected to the base electrode of the switching transistor 7 and to which a switching pulse having the same or narrower pulse-width than a blanking period is applied, a charging capacitor 9 connected to the emitter electrode of the transistor 7, and an amplifying circuit 10 having a sufficiently high input impedance therein. It is to be noted that the color television receiver is provided with a plurality of demodulators for demodulating chroma signals having constructions similar to that of the demodulating circuit as shown in FIG. 1 although other demodulators are not shown in FIG. 1 except for the demodulating circuit 3.

Figure 2:
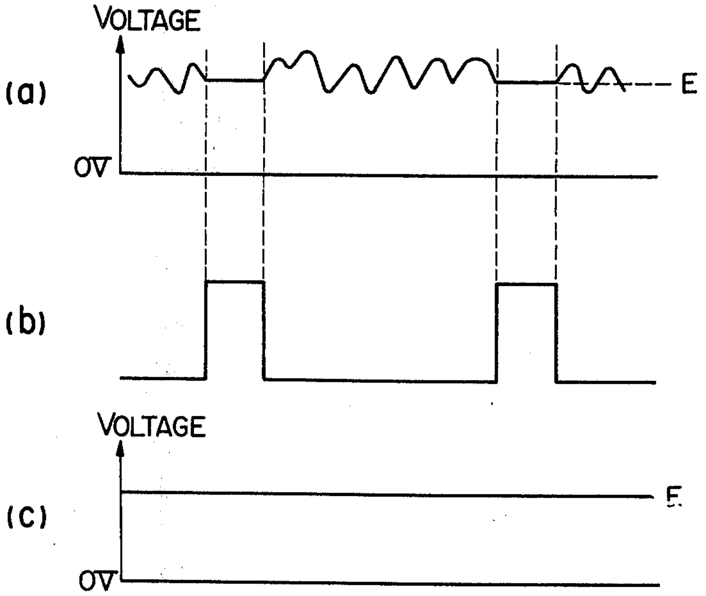
FIG. 2 shows wave forms serving to explain the operation of the chroma controlling circuit of FIG. 1.

In operation, the chroma signal demodulated by the demodulating circuit 3 is amplified by the transistor 4 and then produced at the output terminal 6 at which the wave form of the signal is illustrated as shown in FIG. 2*a*. On the other hand, to the terminal 8 is applied a pulse signal shown in FIG. 2*b* in synchronism with the signal at the output terminal 6. Thus, the application of the pulse to the base electrode of the transistor 7 causes the transistor 7 to be turned on the charge the capacitor 9. It is to be noted, in this case, that the time constant defined by the output impedance of the transistor 4 and the capacitor 9 is so selected as to charge the capacitor 9 to saturation during the appearance of the pulse applied to the terminal 8. The disappearance of the pulse applied to the terminal 8 causes the transistor 7 to be turned off to allow the charging voltage of the capacitor 9 to be maintained constant until the next turning-on of the transistor 7 due to the high input impedance of the amplifying circuit 10. The charging voltage of the capacitor 9 is, after being amplified by the amplifier 10, applied to the output terminal of the chroma demodulating circuit 3 to thereby change the output level of the demodulating signal with the result of the generation of the stabilized chroma demodulating signal at the output terminal 6. It will be seen that the capacitor 9 has only to have one terminal thereof connected to the operational circuit because the other terminal is earthed Thus, the chroma controlling circuit brings about advantages as follows: only one more terminal is required for connecting the capacitor to the demodulating circuit when the latter is obtained in integrated circuit realization; and the chroma demodulating circuit itself is directly coupled to the circuit for driving the color cathode ray tube, so that the chroma demodulating circuit can be easily obtained in the integrated circuit realization with the number of required elements decreased and with the manufacturing cost reduced.

It will be appreciated that the output signal of the amplifying circuit may be applied to a biasing circuit of the demodulating circuit to control the output level of the demodulating circuit, instead of applying it to the base electrode of the transistor as shown in FIG. 1.

The embodiment of the present invention as shown in FIG. 1 is based on the principle that the demodulating output signal produced over the blanking period is once stored and then fed back to the transistor 4.

Figure 3:
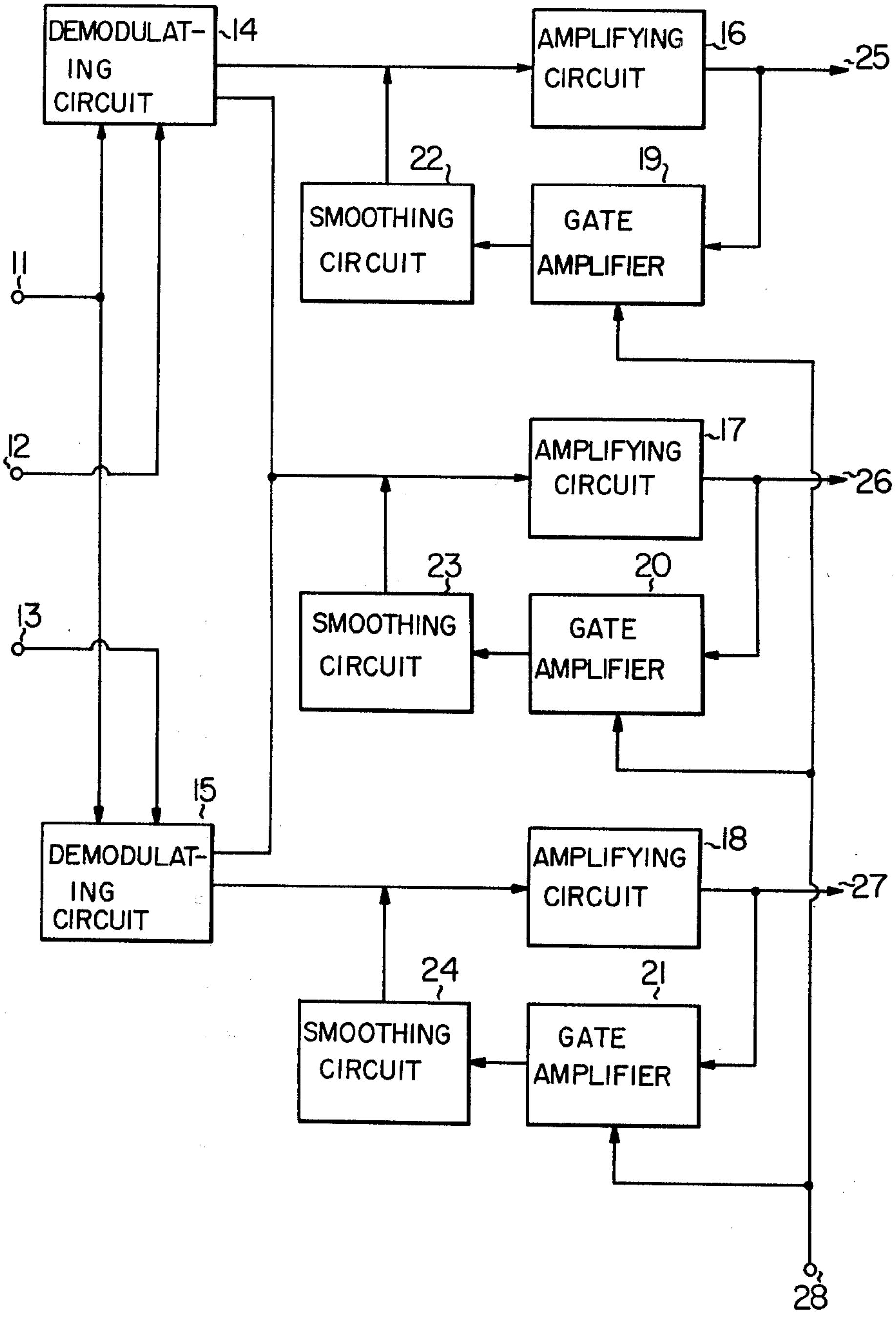
FIG. 3 is a block diagram showing a total embodiment of a chroma controlling circuit according to the present invention.

In FIG. 3, there is a total embodiment of the chroma controlling circuit, which, in contrast to the above-mentioned embodiment, is based on the principle that the demodulating signal produced during the blanking period is detected for feed-back.

The chroma controlling circuit according to the present embodiment comprises an input terminal 11 to which an output signal from a bandpass amplifying circuit is applied, an input terminal 12 to which a subcarrier having a frequency of 3.58 MHz is applied, an input terminal 13 to which a signal 90° different in phase from the above subcarrier is applied, a circuit 14 for demodulating an R-Y signal, circuit 15 for demodulating a B-Y signal, amplifying circuits 16 and 18 for amplifying the output signals from the demodulating circuits 14 and 15, respectively, an amplifying circuit 17 for amplifying a G-Y signal produced by processing the output signals from the demodulating circuits 14 and 15 in a suitable ratio of the B-Y signal to the R-Y signal in a matrix circuit, gate amplifiers 19 to 21 for amplifying the signals extracted from the output signals from the amplifying circuits 16 to 18 only over the blanking period, smoothing circuits 22 to 24, output terminals 25 to 27 at which R-Y, G-Y and B-Y signals are, respectively, produced and which are directly coupled to the circuit for driving the color cathode ray tube; and a terminal 28 to which a gate pulse having the same or narrow width and the same phase as that of the blanking period is applied.

In operation, the demodulating circuits 14 and 15 demodulate R-Y and B-Y signals, respectively, and on the other hand, the amplifying circuits 16 to 18 amplify R-Y, G-Y and B-Y signals, respectively. Further, the gate amplifiers 19 to 21 amplify the chrominance difference signals respectively extracted from the corresponding amplifying circuits 16 to 18 over the blanking periods. The thus extracted signals are smoothed by the smoothing circuits 22 to 24, respectively, and then negatively fed back to the output terminal of the demodulating circuits 14 and 15. In this way, the blanking voltages at the output terminals of the amplifying circuits 16 to 18 are kept stabilized enough to be directly applied to the driving circuit for the color cathode ray tube through the terminals 25 to 27. Further, the output signals of the smoothing circuits 22 to 24 are also applied to the demodulating circuits 14 and 15 to electrically stabilize the output signals of the demodulating circuits so that the latter can be directly coupled to the driving circuit for the color cathode ray tube. It will be, therefore, understood that the demodulating circuits 14 and 15 are directly coupled to the circuit for driving the color cathode ray tube without employing any D.C. restorer such as a clamping circuit for regenerating the D.C. component of the signals.

Figure 4:
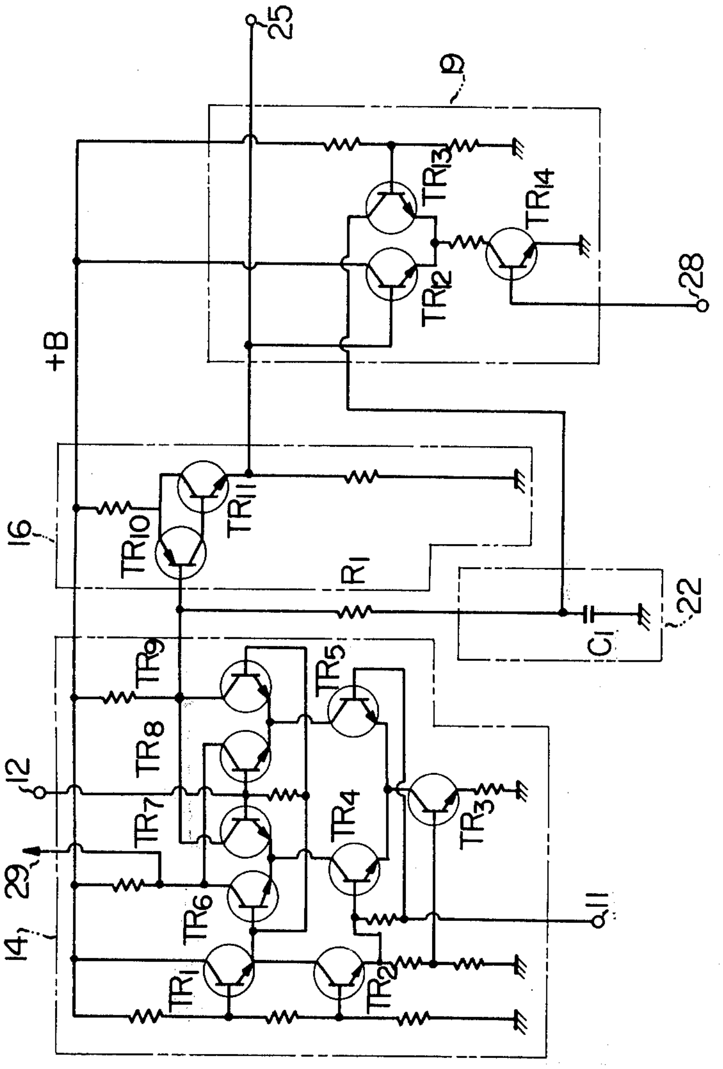
FIG. 4 is a particular connection diagram showing main portions of the block diagram shown in FIG. 3.

FIG. 4 shows the particular electrical configuration of portions of the circuit shown in FIG. 3 the reference numbers of which are, in part, introduced to the portions corresponding to the block diagrams of FIG. 3. In the same FIGURE, the demodualting circuit 14 includes transistors TR1 and TR2 for supplying bias voltages, a transistor TR3 for defining a bias current flowing through the demodulating circuit, transistors TR4 and TR5 serving as a differential amplifier, and transistors TR6 and TR9 serving as switching circuits operated by the signal having a frequency of 3.58 MHz.

The output signal of the demodulating circuit 14, that is, the color difference signal R-Y, is produced and applied to the amplifier 16 with the component of 3.58 MHz signal cancelled due to commonconnected collectors of the transistors TR7 and TR9.

The amplifying circuit 16 includes transistors TR10 and TR11 complementary configuration for producing at its output terminal 25 the amplified signal, which is also applied to a transistor TR12 constituting the differential amplifier together with a transistor TR13 in the gate amplifier 19. The application of the pulse signal to the base of a transistor TR14 connected to the common emitters of the transistors TR12 and TR13 causes the gate amplifier to be kept turned on during the application of the pulse to allow the generation of the amplified signal at the collector of the transistor TR13 only during the blanking period. The thus produced signal is smoothed by a capacitor C1 of the smoothing circuit 22 and applied to the input terminal of the amplifying circuit 16 through a resistor R1, serving as a limiter for preventing the output signal from the demodulating circuit 14 from being smoothed by the capacitor C1. At a terminal 29 is produced the demodulated signal with reversed polarity, that is, the color difference signal R-Y. This is used when the G-Y signal is obtained according to the following resistance matrix formula: G-Y = 0.51(R-Y) − 0.19(B-Y).

Figure 5:
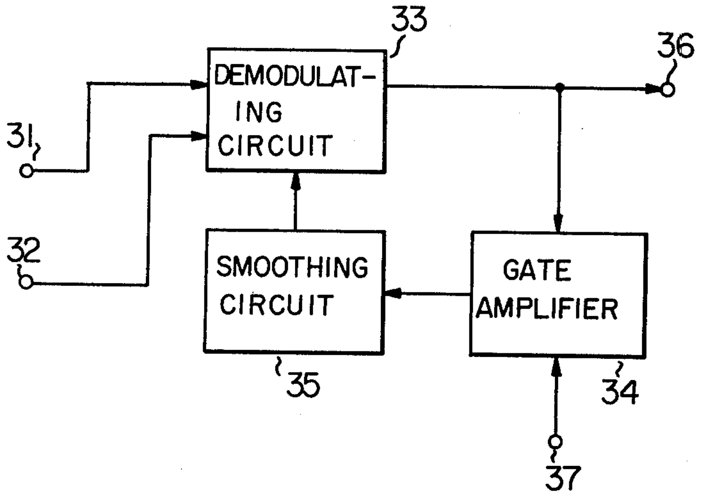
FIG. 5 is a block diagram showing still another embodiment of a chroma controlling circuit according to the present invention.

In FIG. 5, there is shown another embodiment of the chroma controlling circuit according to the present invention comprising an input terminal 31 to which a chroma signal is applied, an input terminal 32 to which a subcarrier signal having a frequency of 3.58 MHz is applied, a demodulating circuit 33 for demodulating the chroma signal, an input terminal 37 to which a gate signal is applied, and an output terminal 36 of the demodulating circuit, from which the signal demodulated through a gate amplifier 34 over a blanking period is derived and smoothed by a smoothing circuit 35 to stabilize the voltage at the output terminal of the demodulating circuit due to the adjustment of the bias voltage by applying the smoothed signal to the bias terminal of the demodulating circuit. The connection similar to that of FIG. 3 can be obtained using three circuits as shown in FIG. 3 to generate three color difference signals R-Y, B-Y and G-Y respectively applied to the color television receiver. The particular configuration of the present invention can be obtained by removing the amplifying circuit 16 from the circuit in FIG. 4 and by connecting the lines so that the smoothed signal can be applied to the base of the transistor TR3 in the demodulating circuit.

Figure 6:
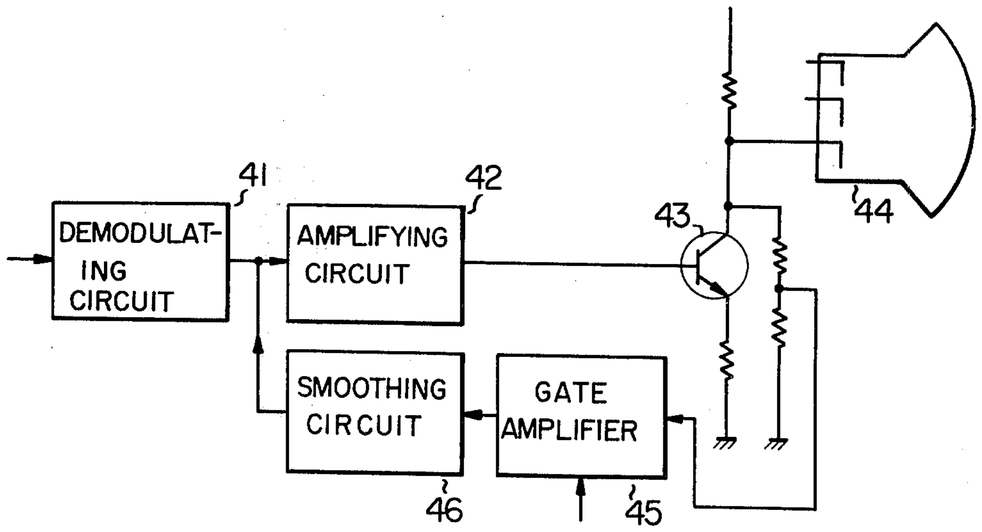
FIG. 6 is a block diagram showing a further embodiment of a chroma controlling circuit according to the present invention.

FIG. 6 shows still another embodiment of the chroma controlling circuit comprising a circuit 41 for demodulating an R-Y signal, an amplifying circuit 42, a power amplifying transistor 43 for driving the color cathode ray tube 44, a gate amplifier 45 for extracting and amplifying the signal produced over a blanking period, and a smoothing circuit 46. In the embodiment, to the demodulating circuit 41 is negatively fed back a collector signal produced by the transistor 43 serving as a power amplifying circuit in the last stage of the color-signal controlling circuits with the result of a further improved and stabilized output level. Thus it will be appreciated that the output signal is directly coupled to the power amplifying circuit for driving the color cathode ray tube without employing and D.C. restorer such as clamping circuits, resulting in the simplified electronic circuits. Furthermore, the chroma controlling circuit of the present invention advantageously absorbs a voltage fluctuation resulting from the deviation of the circuit elements such as resistors, leading to the easy attainment of the circuits in the integrated circuit realization.

1. In a color television receiver, a chroma controlling circuit comprising:

a plurality of first circuit means for demodulating a modulated chroma signal having a blanking period, said first circuit means having an input for a modulated chroma signal, an input for a reference subcarrier, an output for a demodulated color difference signal, and a DC controlling means coupling a received DC signal and said demodulated color difference signal, so that the DC level of the demodulated color difference signal at said output is dependent on said received DC signal, said demodulated color difference signal being directly coupled respectively to a power amplifier circuit for driving a color picture tube;

a plurality of second circuit means for extracting respectively the DC level of each color difference signal over a portion of the blanking period, said second circuit means having an input for a color difference signal and an output for a continuous DC signal proportional to the respective extracted DC level; and a plurality of third circuit means for feeding continuous DC signals back to each of the DC controlling means of the first circuit means for demodulating a chroma signal, thereby maintaining a quiescent DC level at said output for the demodulated color difference signal at a substantially predetermined level.

2. A chroma controlling circuit as set forth in claim 1, wherein said second circuit means for extracting the DC level of each color difference signal includes;

a switching element rendered completely conductive over a portion of the blanking period, a capacitor connected in series with the switching element, the series connected switching element and the capacitor being connected across an output terminal of a first circuit means for demodulating a chroma signal and ground, and the connection point of the switching element and the capacitor being connected to a high impedance input terminal of a third circuit means for feeding DC signals.

3. A chroma controlling circuit as set forth in claim 1, wherein said second circuit means for extracting the DC level of each color difference signal includes;

a first transistor whose base is connected to an output of a first circuit means for demodulating a chroma signal, a second transistor to whose base a common DC level is applied, a third transistor to whose base a gating pulse is applied, and whose collector is connected to common emitters of said first and second transistors, and a capacitor connected across the collector of said second transistor and ground.

4. A chroma controlling circuit as set forth in claim 1, wherein said first circuit means includes;

first and second transistors comprising a common emitter differential amplifier, third and fourth transistors comprising a common emitter differential amplifier, fifth and sixth transistors comprising a common emitter differential amplifier, a chroma signal being applied to the base of one of said fifth and sixth transistors and a seventh transistor whose collector is connected to the common emitters of said fifth and sixth transistors, in which the bases of said first and fourth transistors are common and a reference subcarrier is applied to the common bases of said second and third transistors, the color difference signal being produced on a common collector load of said second and fourth transistors, and the collectors of said fifth and sixth transistors being connected to the common emitters of said first and second transistors and the common emitters of said third and fourth transistors respectively.

5. A chroma controlling circuit as set forth in claim 4, wherein said third circuit means feeds a DC signal proportional to the extracted DC level back to the base of said seventh transistor.

6. In a color television receiver, a chroma controlling circuit comprising:

a plurality of first circuit means for demodulating a modulated chroma signal having a blanking period, said first circuit means including a chroma demodulator and an amplifier directly coupled to said chroma demodulator and providing output signals, said chroma demodulator having an input for a modulated chroma signal, an input for a reference subcarrier, an output for a demodulated color difference signal, and a DC controlling means coupling a received DC signal and said demodulated color difference signal, so that the DC level of the demodulated color difference signal at said output is dependent on said received DC signal, and output signals of said amplifier being directly coupled respectively to a power amplifier circuit for driving a color picture tube;

a plurality of second circuit means for extracting respectively each DC level of the output signals of said amplifier over a portion of the blanking period, said second circuit means having an input for a color difference signal and an output for a continuous DC signal proportional to the respective extracted DC level; and a plurality of third circuit means for feeding continuous DC signals back to each of the DC controlling means of each said chroma demodulator, thereby maintaining a quiescent DC level at the output of said amplifier at a substantially predetermined level.

* * * * *